United States Patent [19]

Herbst et al.

[11] 4,334,150
[45] Jun. 8, 1982

[54] CIRCUIT WITH AN EXPOSURE MEASURING UNIT FOR SENSOR CONTROLLED RANGE MEASUREMENT

[75] Inventors: Heiner Herbst, Munich; Hans-Joerg Pfleiderer, Zorneding; Hans-Peter Grassl, Munich, all of Fed. Rep. of Germany

[73] Assignee: Siemens Aktiengesellschaft, Berlin & Munich, Fed. Rep. of Germany

[21] Appl. No.: 168,648

[22] Filed: Jul. 11, 1980

[30] Foreign Application Priority Data

Sep. 10, 1979 [DE] Fed. Rep. of Germany ....... 2936491

[51] Int. Cl.³ .............................................. G01C 3/08
[52] U.S. Cl. ................................. 250/201; 250/211 J; 307/221 D; 354/25; 356/4; 357/24
[58] Field of Search ................... 250/201, 204, 211 J, 250/578; 307/221 D; 357/24 R; 356/1, 4; 354/25

[56] References Cited

U.S. PATENT DOCUMENTS 4,178,098 12/1979 Asano et al. .................... 250/201 X
4,283,137 8/1981 Tsunekawa et al. ............ 250/204 X
4,290,693 9/1981 Stein ...................................... 356/1

FOREIGN PATENT DOCUMENTS 2838647 4/1980 Fed. Rep. of Germany .

OTHER PUBLICATIONS

"Electronics", Nov. 10, 1977, pp. 40-44.

Primary Examiner—David C. Nelms
Assistant Examiner—Edward P. Westin
Attorney, Agent, or Firm—Hill, Van Santen, Steadman, Chiara & Simpson

[57] ABSTRACT

A circuit for sensor-controlled distance measurement with two linear image sensors is disclosed. These sensors are exposed to lines corresponding to two images derived from one object. The sensor signals are subjected to correlation measurements, from which the range of the object is determined. An exposure-measuring circuit determines the optimum integration time of the sensor elements. In the case of such circuits, one sets as exact a distance measurement as possible. For this purpose, comparing sensor elements of the exposure-measuring circuit, which are provided with a mean value of the exposure of many sensor locations, are designed such that they extend only over a part of the sensor lines. They are arranged in a sequence which runs along the entire sensor line. A separate controlling of the optimum integration time proceeds over individual line portions. A range of application for the invention encompasses photographic and electronic cameras.

12 Claims, 8 Drawing Figures

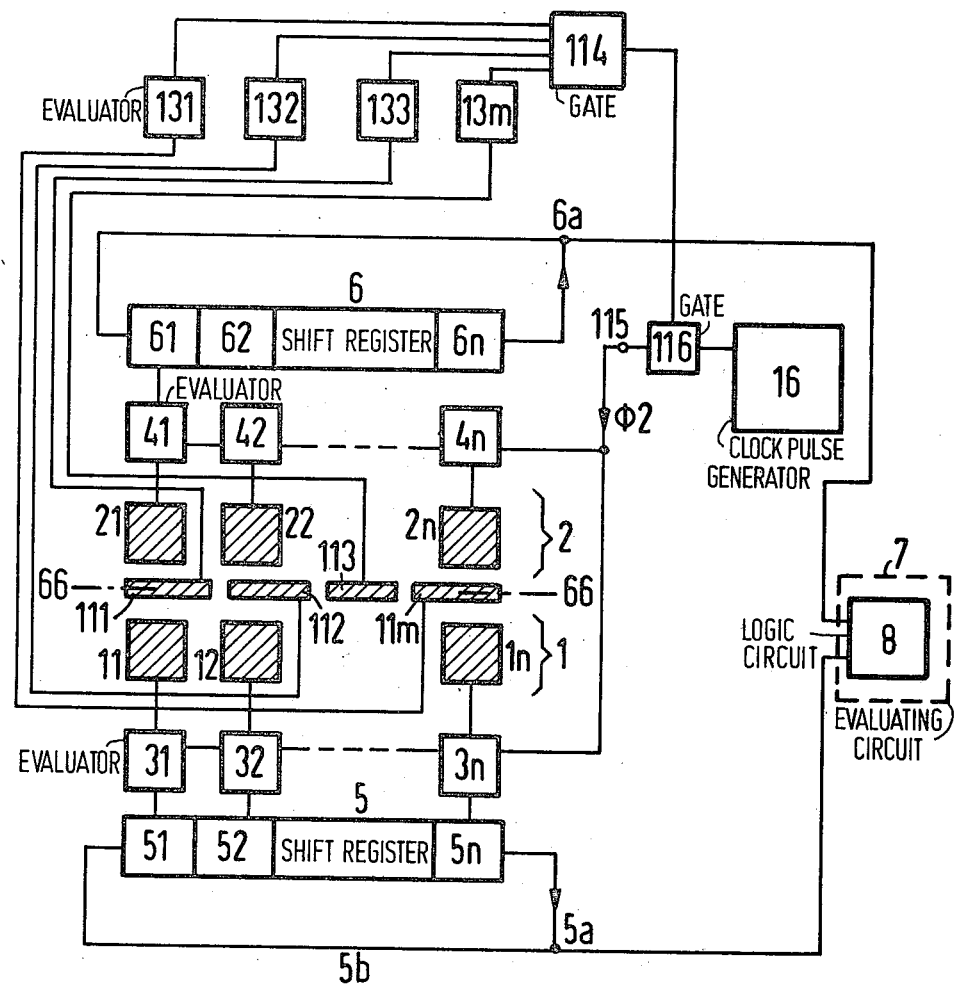

CIRCUIT WITH AN EXPOSURE MEASURING UNIT FOR SENSOR CONTROLLED RANGE MEASUREMENT

BACKGROUND OF THE INVENTION

The invention concerns a circuit provided with an exposure measuring portion for sensor-controlled distance or range measurement where two linear semiconductor image sensors are provided each having individual sensor elements. Line segments corresponding to the two images and separately obtained from the object are projected onto the image sensors. Switching circuits are connected to the sensor elements which are switchable between two different states and an evaluator is provided for evaluating these two state sensor signals in dependence upon different position displacements with respect to a maximum correlation. Comparing sensor elements are also provided and receive optically generated charge quantities corresponding to sensor elements in the image sensors.

Circuits of this type are specified in German patent application P No. 2,838,647.2, incorporated herein by reference. If they are designed such that the length of a comparing sensor element approximately corresponds to the length of a linear image sensor or exceeds this, then difficulties can result in the determination of an integration time which is required for an exact distance or range measurement. Integration time is here understood as the time span in which an optical charge generation proceeds in the individual sensor element as a result of exposure by means of the projected line segments.

These difficulties occur for example when a small part of the line segment which is projected onto an image sensor and onto the comparing sensor element which adjoins this displays a large amount of brightness, whereas the other, preponderant part of the line segment is dark. In this case, the comparing sensor element forms a mean charge value which is close to the darkness value. The integration time which is determined by the evaluator of the exposure measuring part is then so large that the sensor elements which are directed to the dark points of the line segment have taken up optically generated charges which are only slightly smaller than their reference charge. Therefore, the digital logic states which are set in the associated evaluators are very strongly dependent upon parameter or characteristic variations of the sensor elements and of the evaluator circuits, so that a brightness curve which is in fact not present is simulated along the line segment. If on the other hand the comparing sensor element is designed significantly shorter than the linear image sensors, then in the case of the determination of the integration time, there also results inaccuracies, since the exposure of the sensor elements of the image sensor which are further removed from the comparing sensor elements remain out of consideration.

SUMMARY OF THE INVENTION

It is an object of the invention to eliminate the difficulties mentioned above in the case of the circuit of the kind earlier described. This problem is solved by providing a circuit of the previously described type wherein the comparing sensor elements are arranged along a longitudinal axis parallel to at least one of the linear image sensors. Dimensions of the individual comparing sensor elements along the longitudinal axis are substantially smaller than a corresponding dimension of the at least one image sensor. Each of the individual comparing sensor elements is connected via an evaluator means to associated inputs of a gate circuit means, an output of which represents an output of the exposure measuring portion. The evaluator means switches between two different states depending on whether a reference charge in the comparing sensor element is exceeded.

An advantage to be obtained with the invention is that a strongly non-uniform exposure of the linear image sensor or image sensors is equalized to a large extent by means of the arrangement of several comparing sensor elements, of which each by itself influences the duration of the integration time.

BRIEF DESCRIPTION OF THE DRAWINGS

FIG. 8 shows a third embodiment of the invention.

DESCRIPTION OF THE PREFERRED EMBODIMENTS

Figure 1:
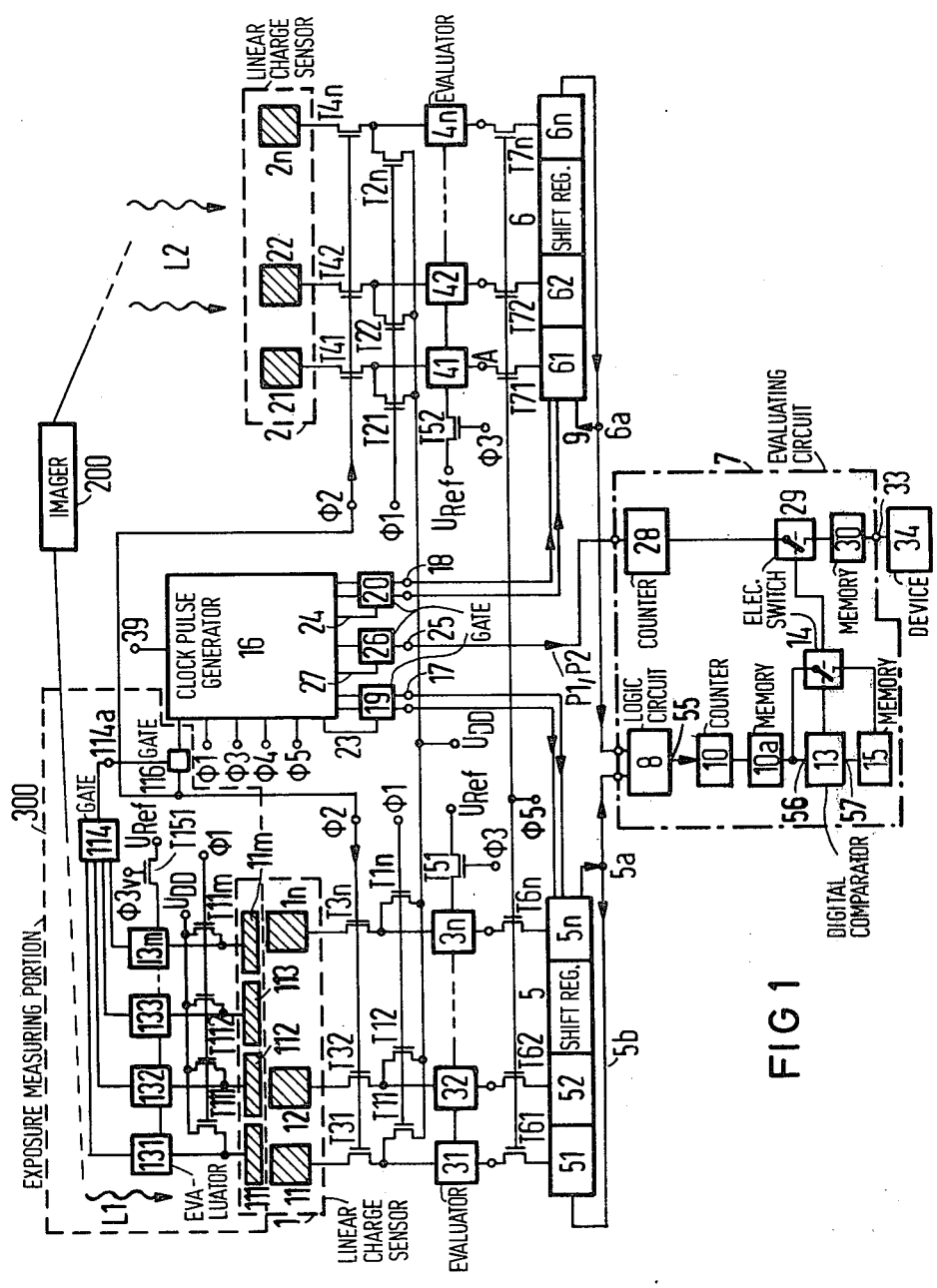
FIG. 1 illustrates in a circuit diagram a preferred embodiment of the invention.

The circuit presented in FIG. 1 contains two linear image sensors 1 and 2 which have inserted in them sensor elements 11, 12 ... 1$n$ and 21, 22 ... 2$n$. The image sensors 1, 2 are integrated upon a doped semiconductor body of a first conductivity type. If the sensor elements are realized as photodiodes, then the shaded rectangles represent regions of a second conductivity type opposed to the first which are arranged on an interface of the semiconductor body. The sensor elements 11 ... 1$n$ and 21 ... 2$n$ are connected with leads which are connected with a supply voltage $U_{DD}$ via individually associated switching transistors T11 ... T1$n$ and T31 ... T3$n$, or respectively, T21 ... T2$n$ and T41 ... T4$n$, which are connected in series. The gate electrodes of the switching transistors T11 ... T1$n$ and T21 ... T2$n$ are in each case connected to a common lead, to which a clock pulse voltage $\phi 1$ is supplied. The sensor elements 11 ... 1$n$ and 21 ... 2$n$ are connected with inputs of evaluators 31 ... 3$n$ and 41 ... 4$n$ on the other side via the switching transistors T31 ... T3$n$ and T41 ... T4$n$, the gate electrodes of which are connected with a common clock pulse voltage $\phi 2$.

Figure 2:
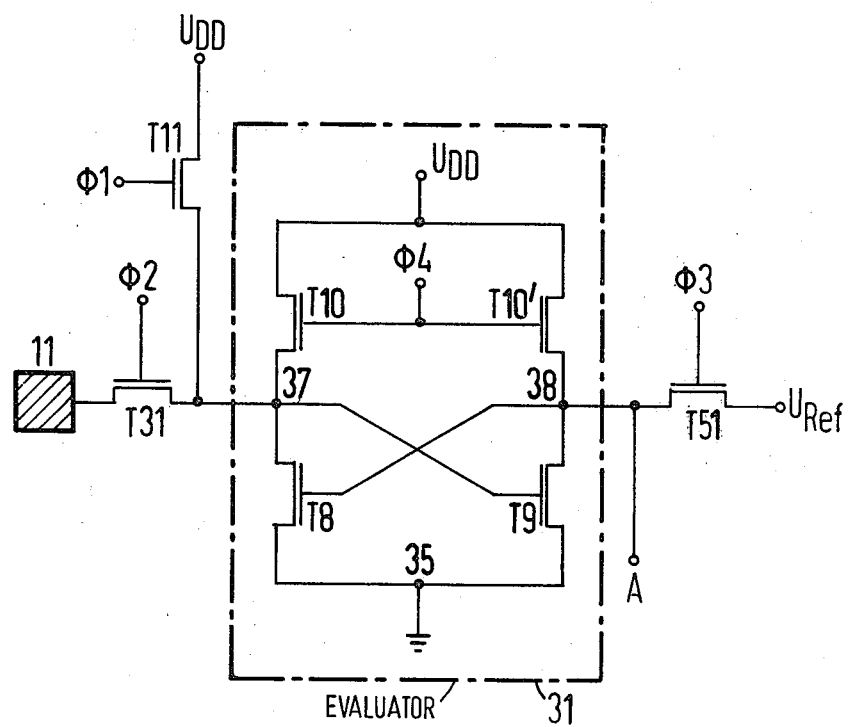
FIG. 2 shows a portion of the circuit of FIG. 1.

A practical circuitry engineering model of the evaluators 31 ... 3$n$ and 41 ... 4$n$ is to be explained more precisely with the use of FIG. 2. Further inputs of these evaluators are connected to leads which lie at a reference voltage $U_{Ref}$, via common switching transistors T51 and T52, the gate electrodes of which are connected with a clock pulse voltage $\phi 3$. The evaluators 31 ... 3$n$ and 41 ... 4$n$ can assume one of two possible logic states, in dependence upon the voltages which are supplied to them via the switching transistors T31 ... T3$n$ and T41 ... T4$n$. Their output signals S11 ... S1$n$ and S21 ... S2$n$ which correspond, according to the logic state assumed, to the logic voltage level "1" or "0", are supplied via transfer transistors T61 ... T6n and T71 ... T7n to the inputs of the individual steps 51, 52 ... 5n and 61, 62 ... 6n of two shift registers 5 and 6 which are individually associated to the image sensors. The gate electrodes of these transistors are provided with a common clock pulse voltage $\phi 5$. The shift registers preferably are designed as two-phase dynamic shift registers. The shift register 5 displays two inputs which are connected with clock pulse voltages $\phi iL$ and $\phi 2L$, whereas the shift register 6 has two inputs, to which the clock pulse voltage $\phi 1R$ and $\phi 2R$ are supplied. The output 5 of the step 5n is on one side connected via a line 5b with the input of the step 51 and on the other side is connected to a first input of a logic circuit 8 which is arranged in an evaluating circuit 7. The output 6a of the step 6n is connected in a corresponding manner via a line 9 to the input of the step 61 and on the other side is connected with a second input of 8.

To the logic circuit 8 is connected a counter 10, the output of which is connected via a memory 10a with the first input of a digital comparator 13, and via an electronic switch 14 with a memory 15. The output of the memory 15 is directed to a second input of the digital comparator 13.

The clock pulse generator 16 is provided with outputs for the clock pulse voltages $\phi 1$, $\phi 3$, $\phi 5$. Via further outputs 17 and 18, the clock pulse voltages $\phi 1L$ and $\phi 2L$ as well as $\phi 1R$ and $\phi 2R$ are released, whereby there are arranged a gate circuit 19 in series to outputs 17 and a gate circuit 20 in series to outputs 18. The control inputs of 19 and 20 are connected via lines 23 and 24 with control signals which are still to be specified more precisely. The clock pulse generator displays a further output 25, to which a further gate circuit 26 is arranged in series. This is occupied via a line 27 with a further control signal. The output 25 is connected with the input of a counter 28, the output of which is connected via an electronic switch 29 with a memory 30. The output 33 of the memory 30 is connected with a further device 34 which is specified hereafter.

Next to the sensor elements 11 ... 1n are arranged several comparing sensor elements 111, 112 ... 11m which are designed strip-shaped, the longitudinal axes of which are aligned according to a line running parallel to the image sensor 1. The length of each of the comparing sensor elements 111 ... 11m, measured in the longitudinal direction of the image sensor 1, is thereby significantly smaller than the length of the image sensor 1, measured in the same direction. If one proceeds from the fact that the image sensor contains for example 84 sensor elements arranged in a line, then, for example 7 comparing sensor elements can be provided which are arranged in a line one after the other. Accordingly, the length of an individual comparing sensor element corresponds approximately to the length of 12 sensor elements. In general, each comparing sensor element is designed extended to such an extent that its surface in each case corresponds to the sum of the surfaces of a plurality of sensor elements 11 ... 1n.

The comparing sensor elements 111 ... 11m are connected via switching transistors T111 ... T11m with a common lead which is connected with the supply voltage $U_{DD}$. Accordingly, the gate electrodes of the transistors T111 ... T11m are provided with the clock pulse voltage 1. On the other side, the comparing sensor elements 111 ... 11m are connected with the inputs of evaluators 131, 132 ... 13m, which approximately correspond to the evaluators 31 ... 3n and 41 ... 4n in their structure. The outputs of the evaluators 131 ... 13m are directed to the inputs of a gate circuit 114, the output of which is connected to the control input of a gate circuit 116. The gate circuit 116 is arranged in series to an output 115 of the clock pulse generator 16, at which the clock pulse voltage $\phi 2$ can be obtained. The circuit portions 111 ... , T111 ... , 131 ... , 114, 116 and T151 represent the exposure measuring part of the circuit, indicated by 300.

FIG. 2 shows a practical design of the evaluators 31 ... 3n, 41 ... 4n and 131, 132 ... 13m with the evaluator 31. It consists of a flip flop circuit with the switching transistors T8 and T9 and the transistors T10 and T10' which are operated as switchable load elements. The source leads of T8 and T9 are connected via a common lead 35 to the reference potential of the circuit. The drain leads of T10 and T10' are connected via a common lead to the supply voltage $U_{DD}$. The input node of the evaluator 31 is designated 37, and the output node, connected with the output A, is designated 38. Between the gate electrodes of T8 and T9 and the nodes 37 and 38 there exists a cross-coupling. The gate electrodes of T10 and T10' of the evaluators 31 ... 3n and 41 ... 4n are connected via a common lead with a clock pulse voltage $\phi 4$. The circuit parts T11, 11 and T31 as well as T51, which are connected to the nodes 37 and 38, were specified already with the reference to FIG. 1.

The principle of distance measurement of an object which is used in the case of the invention proceeds from the fact that from this object, via two optical devices represented by imager 200 in FIG. 1 two separate images are created, the distance-dependent relative positions of which are evaluated. The light beams L1 in FIG. 1 thereby proceed from the object whose distance is to be determined. Via a first optical device, they project an image of the same object in such a manner on the surface of the image sensor 1 that this is directed onto a line segment of the image. In an analogous manner, the light beam L2, which result via a second optical device from the object, project a second image of the same onto the surface of the image sensor 2, and in such manner that it is directed onto the same line segment, when the object is located at a predetermined distance, for example, at the distance "infinite". If the distance of the object changes with respect to the predetermined value, then the line segments which are projected onto the image sensors 1 and 2 are displaced correspondingly in a longitudinal direction of the image sensors. The size of the mutual displacement thereby represents a measurement for the actual distance of the object. A similar method of distance measurement utilizes the above described relative displacement of two images of the object, but instead of linear image sensors, plane-like arrangements of photodiodes are provided, is known for example from the magazine "Electronics" of Nov. 10, 1977, pages 40 through 44, incorporated herein by reference.

Figure 3:
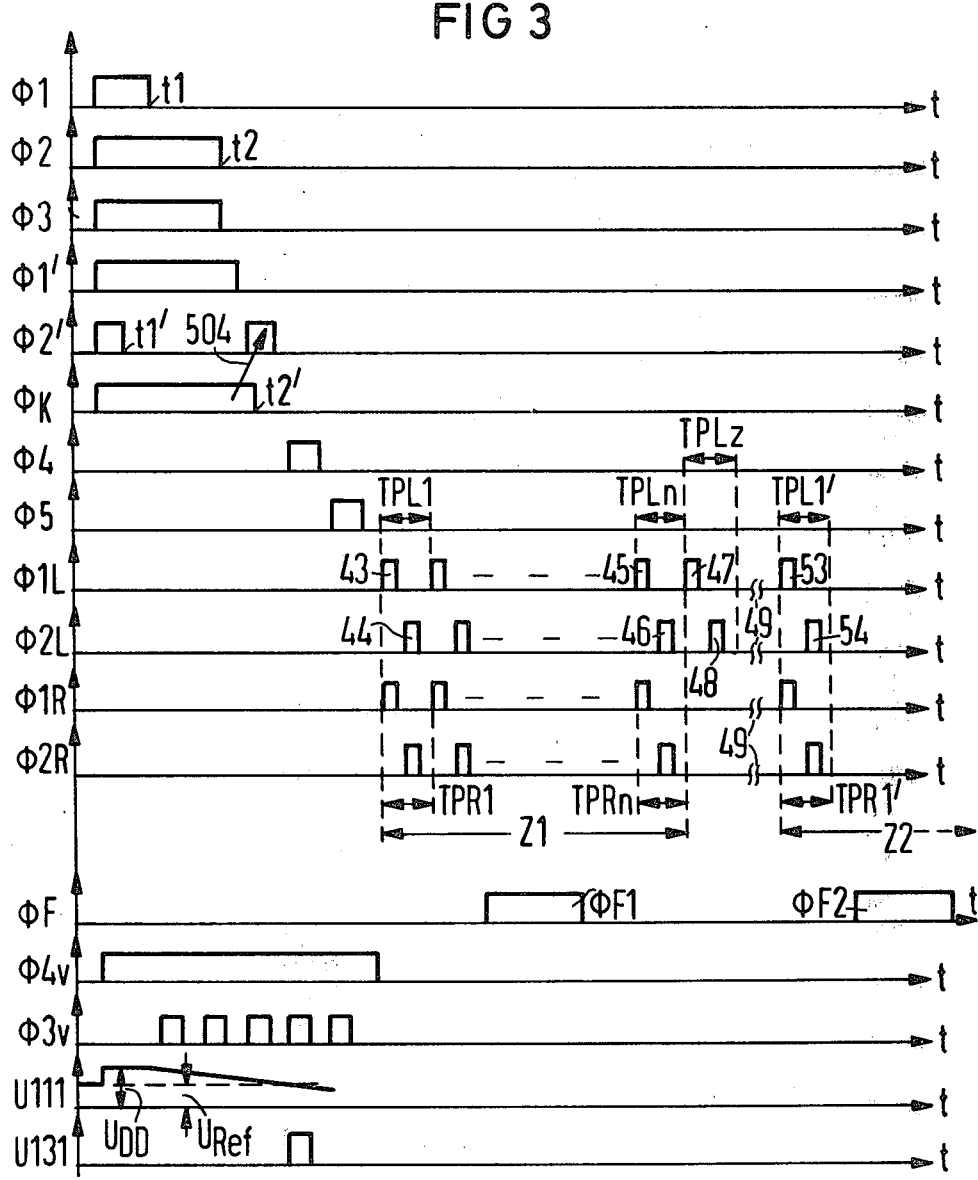
FIG. 3 shows voltage-time diagrams for explanation of FIGS. 1 and 2.

The manner of operation of the circuit according to the FIGS. 1 and 2 results in connection with the pulsetime diagrams according to FIG. 3 which shows the outputs required of clock pulse generator 16, the construction of which is well-known in the art given the required output signals. If a trigger pulse is supplied to an input 39 of the clock pulse generator 16, then this first releases clock pulses $\phi 1$ and $\phi 2$. With this, the sensor elements, for example 11, and the input nodes, for example 37, of the evaluators 31 ... 3n and 41 ... 4n are reset via the conducting transistors, for example T11 and T31, to the supply voltage $U_{DD}$. A simultaneous starting clock pulse $\phi3$ switches T51 into the conducting state, so that the output node 38 is placed at the reference voltage $U_{Ref}$. With disconnection of the clock pulse $\phi1$, the charge carriers which are generated in the sensor elements, for example, 11, by means of the incident light beam L1, or respectively, L2, begin to collect, whereby in the sensor elements a voltage drop arises. The larger the optically generated charges are which have collected in the sensor elements 11 ... 1n and 21 ... 2n in each case, the more strongly the potential decreases at the associated input mode, for example, 37 of the evaluator. The time span between the end of the clock pulse $\phi1$ to the point in time t1, and the end of the clock pulse $\phi2$ to the point in time t2, is designated as integration time. Only within this span do optically generated charges collect in the sensor elements. After ending of the clock pulse $\phi2$ and after ending of the clock pulse $\phi3$, a clock pulse $\phi4$ which can be obtained at a further output of the clock pulse generator, is placed at the gate electrodes of T10 and T10', so that the flip flop circuits of the evaluators 31 ... 3n and 41 ... 4n are activated. At the output node, for example, 38, when a voltage drop had occurred at node 37 below which the reference voltage $U_{Ref}$ had fallen, a voltage arises which corresponds approximately to the supply voltage $U_{DD}$ (logic "1"). If on the other hand the voltage at node 37 does not fall below $U_{Ref}$, then the node 38 arrives at a potential which approximately corresponds to the reference potential at lead 35 (logic "0"). With this, each evaluator releases a digitalized sensor signal, for example, S11, the value of which is dependent upon the attainment or non-attainment of a reference charge in the individual sensor elements, which is present precisely when the potential at the node 37 at time t2 approaches the potential of node 38 which was set back to the voltage $U_{Ref}$.

The determination of the optimum integration time proceeds in the following manner. In each individual comparing sensor element, for example 111, after time t1 an optically generated charge quantity collects, which, specific to the surface, that is, related to the exposed surface, corresponds in each case to the mean value of all those charges which have collected at the same time in the sensor elements of the image sensor 1 which are arranged near the comparing sensor element. If one considers that each comparing sensor element is arranged near a specific number of sensor elements 11 ... 1n which is small with respect to the total number of the sensor elements of the image sensor 1, then one can recognize that the surface-specific charge mean value which formed in the comparing sensor element in the case of a non-uniform exposure of the image sensor 1, does not deviate greatly from the local optically generated surface-specific charge quantities in the individual sensor elements 11 ... 1n which are associated to it as would be the case of a single comparing sensor element which extends over the entire length of the image sensor 1 and thus forms a mean value of the charge over the total length of the sensor element line 11 to 1n.

Each charge mean value which was formed in the comparing sensor elements 111 ... 11m causes in the manner already described a voltage drop at the input of an evaluator 131 ... 13m. Each of the same is preferably designed as represented in FIG. 2, whereby the clock pulse voltages $\phi3$ and $\phi4$ are replaced by the voltages $\phi3$ v and $\phi4$ v. At time t1, the voltage U111 begins to sink gradually at 37 proceeding from the reset value $U_{DD}$, as is represented in FIG. 3. The flip-flop circuit is activated by $\phi4$ v. As long a U111 is larger at the node 37 than the voltage $U_{Ref}$, which with the occurrence of each clock pulse $\phi3$ v is placed at node 38, the evaluator 131 releases a logic "0" at the output A. If U111 falls below the voltage $U_{Ref}$, then this evaluator is set in a switching state in which it releases an output signal $U_{131}$ corresponding to the logic level "1". This is supplied via gate circuit 114, which is designed as an OR gate connected with A, to the control input of the gate circuit 116 as a control signal, which interrupts the clock pulse $\phi2$. Thus the integration time has ended for all sensor elements 11 ... 1n and 21 ... 2n. What is significant is that in each case the first evaluator of the evaluator group 131 ... 13m which has switched over to the logic output level "1" already causes the disconnection of $\phi2$. From this it results that the integration time is measured only according to the portion of the sensor element line 11 ... 1n which is exposed the most and which corresponds to a comparing sensor length. In the case of a single comparing sensor element which extends over the entire length of the sensor element line 11 ... 1n, in contrast to this, the mean value of the exposure of the entire line would be drawn upon for the integration time measurement. This would lead to a significantly larger integration time in the case of a greatly non-uniform exposure than in the case of the arrangement shown with several comparing sensor elements 111 ... 11m. With the occurrence of a clock pulse $\phi5$, then, the digitalized sensor signals released from the evaluators 31 ... 3n and 41 ... 4n, for example, S11, are supplied to the inputs of the associated steps, for example, 51 of the shift registers 5 and 6 are stored in these.

The clock pulse generator 16 following this delivers clock pulse sequences $\phi1L$, $\phi2L$, $\phi1R$ and $\phi2R$, which displace the information contained in the steps of the shift registers 5 and 6 in each case by one step. Before the occurrence of the clock pulses 43 and 44, which belong to a clock pulse period TPL1, the sensor signal S1n appears at the output 5a. The clock pulses 43 and 44 displace the information S1n into the step 51 and the information S1(n−1) to the output 5a, and so on. By means of the clock pulses 45 and 46 of the clock pulse period TPLn, finally, after a complete information cycle, the sensor signal S1n again arrives at the output 5a. There follows a clock pulse period TPLz with the clock pulses 47 and 48, by means of which the sensor signal S1(n−1) appears at the output 5a. After a following blanking gap which is designated 49, the clock pulses 53 and 54 of the clock pulse period TPL1' displace the sensor signals again by one step further, so that S1(n−1) proceeds into the step 51 and S1(n−2) is connected through to the output 5a.

In a first read-out cycle Z1, which encompasses the clock pulse periods with TPL1 to TPLn, the sensor signals S1n through S1 and again S1n are released serially at the output 5a. In a second read-out cycle Z2, which encompasses the clock pulse periods TPL1' and n−1 further clock pulse periods, a second serial release of all sensor signals of the image sensor 1 occurs, whereby the signals S1(n−1) to S1 and again S1n and S1(n−1) appear at 5a. Within the first read-out cycle Z1, the shift register 6 is also provided with n clock pulse periods TPR1 through TPRn, while the clock pulses 47 and 48 lack corresponding pulses. This has the result that at the beginning of Z2, the sensor signal S2n is present at the output 6a and the signal S1(n−1) is present at the output 5a.

Therefore, in the first read-out cycle Z1, the signal pairs S1n and S2n, S1(n−1) and S2(n−1), and so on, are read out serially at 5a and 6a. On the other hand, in the second read-out cycle, the signal pairs S1(n−1) and S2n, S1(n−2) and S2(n−1), and so on are read out. The serially read out information of the shift registers 5 and 6 are thus in two consecutively occurring read-out cycles displaced with respect to one another by in each case one signal width. After n read-out cycles, they then have again the same time related association as in the cycle Z1. In FIG. 1, this displacement can be attained such that the gate circuit 20 via the line 24 is blocked during the occurrence of the clock pulses 47 and 48, that is, between the clock pulse periods TPRn and TPR1'. In this time period, the gate circuit 26 can be opened via the control line 27, so that one of the pulses 47 or 48 or a pulse which is derived from these occurs at the output 25 as displacement pulse P1. This displacement pulse P1 thereby characterizes the beginning of a new readout cycle and a mutual displacement of the sensor signals which are read out at the outputs 5a and 6a serially by in each case one signal width.

The sensor signal pairs which are read out within one read-out cycle, for example, Z1 are evaluated in the logic circuit 8 according to the exclusive OR function. Thereby, there always occurs at the output 55 of 8 an output pulse when the digital signals supplied on the input side via 5a and 6a coincide. If they do not coincide, then no output pulse is released from 8. The circuit portion 8 can, however, also be designed such that it only indicates the coincidence of two "1" signals or two "0" signals at its inputs by means of an output pulse. The counter 10 which is set back to zero before the beginning of each read-out cycle, thus in the blanking gaps 49, then counts the number of the coincidences within such a cycle.

Therefore, the counter 10 in any case is only connected to be operative during a part of each read-out cycle which is determined by means of a pulse $\phi F$ which is released from 16. If one assumes that the counter 10 in the read-out cycle Z1 counts the coincidences within the clock pulse periods $TPR_i$ through $TPR_k$, whereby the difference $k-1$ amounts approximately to n/2 or 3n/4, then in the read out cycle Z2, it counts the coincidences within the clock pulse periods $TPR'_{i+1}$ through $TPR'_{k+1}$. If one sees the pulses $\phi F1$ and $\phi F2$ in each case as "read-out windows", then the sensor signals of the shift register 6 have been displaced to the left in the window $\phi F2$ with respect to the window $\phi F1$ by a signal width (FIG. 3). In the next read-out cycle Z3, in which the corresponding pulse $\phi F3$ encompasses the same clock pulse periods as in Z2, the signals have then been displaced from 5 in the "window" $\phi F3$ by one signal width to the right. If the "window" is generally displaced in the first read out cycle Z1 and in the further read out cycles Z3, Z5, Z7 and so on to the right in each case by one clock pulse period length, then that corresponds to an alternating displacement of the sensor signal sequences which are present at 6a, or respectively, 5a in the window $\phi F$ in each case by a signal width to the left, or respectively, to the right. Those pulses $\phi F$, which would simultaneously encompass the evaluator signals which were derived from the line beginning and from the line end of one of the sensor element lines, are suppressed by the clock pulse generator 16. With this, it results that the "windows" $\phi F$ cut out the evaluation of those sensor signals which were derived from the beginning and end segments of the projected line segments which stand next to one another in exchanged association, so that they provide no information concerning the actual brightness curve along the line segment.

If the count of the counter which is supplied to the input 56 of the digital comparator 13 is larger than the digital signal lying at its input 57, then the control inputs of the switches 14 and 29 are presented with a comparator signal so that both switches come into switching states in which they transmit the signals placed at their inputs to the outputs in each case. After the counter results of the coincidences of the first information cycle Z1 is supplied to the memory 15 as a first digital signal and via this memory to the input 57 of the comparator, after this only such a counter result of a further information cycle Zi is taken into the memory 15, which result is larger than the largest which was stored previously in each case. The displacement pulses P1, P2, and so on, which occur at the end of the information cycles Z1, Z2 and so on, are counted in the counter 28. Since the switch 29 is activated synchronously with the switch 14, it always transmits the new counter state 28 in each case to the memory 30 in the case of occurrence of a larger counter result in the counter 10. Therefore, in memory 30 after n information cycles, that number of the displacement pulses Pi is stored which characterizes such an information displacement between the sensor signals of the shift registers 5 and 6 in the case of which the largest number of coincidences occurs. In other words: the number of the shift pulses P1, P2 and so on which are stored in the memory 30 releases that relative displacement of the sensor signals circulating in the shift registers 5 and 6 in the case of which a maximum correlation exists between the sensor signals which are compared with one another.

The blanking gaps 49 which were indicated in FIG. 3, which for example are required in each case for the setting back of the counter 10 to zero, are generated by means of a corresponding blocking of the gate circuits 19 and 20 via their control lines 23 and 24.

The digital signal occurring at the output 33 of the memory 30 is supplied to a device 34, which can be understood as an indicating device, which after a corresponding coding of the digital signal, delivers a digital or analog indication of the distance or range of the object. On the other hand, the device 34 can also consist of an essentially known adjustment device of a photographic or electronic camera which adjusts the distance of a lens which is movable with respect to a focal plane in such a manner that the object is imaged sharply onto this focal plane. A device of this kind is specified for example in German patent application No. P2,813,915.3, corresponding to U.S. Pat. No. 4,247,761, and in the magazine "Electronics" of Nov. 10, 1977 on the pages 40 through 44, both incorporated herein by reference.

Figure 4:
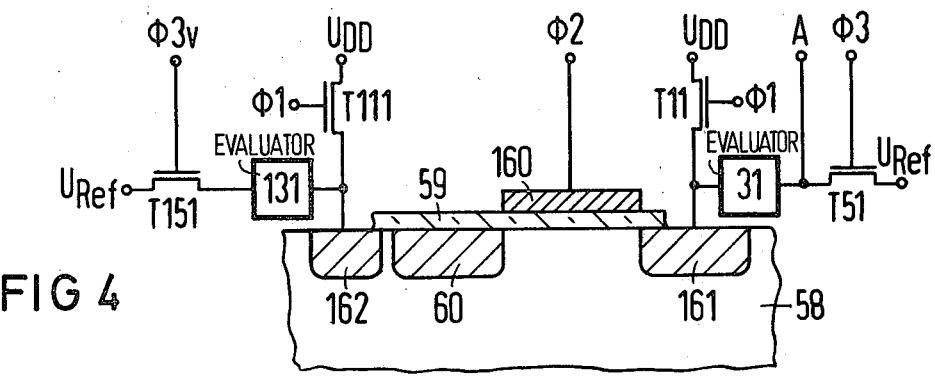
FIG. 4 shows a preferred design of the image sensors according to FIG. 1.

FIG. 4 shows a circuitry design of the sensor elements 11 ... 1n and 21 ... 2n as well as the adjacent circuit parts for the example of the sensor element 11. Upon a doped semiconductor body 58, for example of p-doped silicon, there is provided a thin electrically insulating layer 59, for example of $SiO_2$. The image sensor 11 is designed as a photodiode which consists of the n-doped semiconductor region 60. This region simultaneously forms also the source region of the transistor T31 (FIG. 1). The gate of T31 is arranged on the insulating layer 59 and is designated 160. The drain region of T31 has the reference symbol 161. The region 161 is connected on the one side via the transistor T11 with a lead which is connected with the supply voltage $U_{DD}$, and which on the other side forms the input of the evaluator 31, or respectively, the drain region of the transistor T8 provided therein (FIG. 2) and the source region of the transistor T10. The second input of 31 is connected corresponding to FIG. 2 via the transistor T51 which is provided with $\phi 3$ by a lead which is at the reference voltage $U_{Ref}$. The comparing sensor element 111 is designed as a photodiode which consists of the n-doped region 162. The region 162 is connected on the one side via the transistor T111 which is provided with $\phi 1$ with a lead which is connected with $U_{DD}$, and on the other side is connected to the first input of the evaluator 131, the second input of which via a transistor T151 is provided with $\phi 3v$ lies at the reference voltage $U_{Ref}$.

Figure 5:
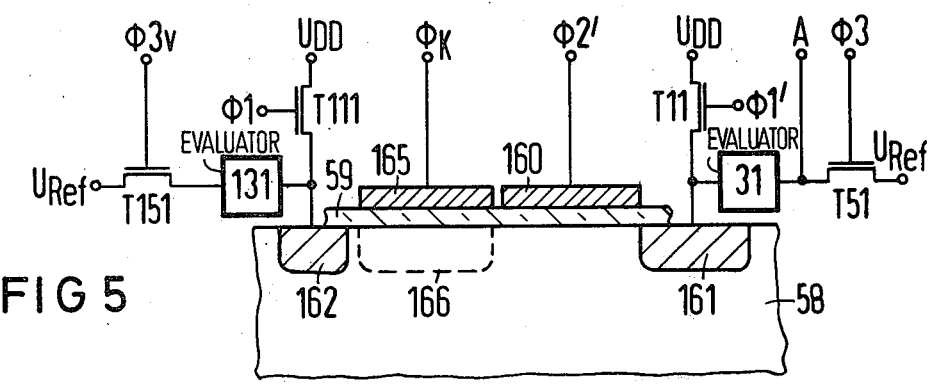
FIG. 5 shows an alternative circuit for that shown in FIG. 4.

An alternative circuit to FIG. 4 is shown in FIG. 5. According to this, the sensor element 11 consists of a MIS capacitor (metal-insulating layer-semiconductor-capacitor) which has a gate 165 arranged on the insulating layer 59. The gate 165 is for example prepared out of highly doped polycrystalline silicon and lies at a clock pulse voltage $\phi_{K'}$ under the influence of which a space charge region 166 forms in the semiconductor body 58. The further circuit parts of FIG. 5 correspond to the circuit parts of FIG. 4 which are provided with the same reference symbols, whereby it is pointed out that the transistor T11 is supplied with a clock pulse voltage $\phi 1'$ and the transistor T31 is supplied with a clock pulse voltage $\phi 2'$. The simultaneous start of clock pulses $\phi 1'$, $\phi 2$ and $\phi_K$ up to the point in time t1' bring about a resetting of the MIS capacitor in the region of the interface 58a of the semiconductor body 58 approximately to the value of the supply voltage $U_{DD}$. At time t1', in the MIS capacitor which is further provided with $\phi_{K'}$ the integration time begins in which optically generated charge carriers are collected. With the end of $\phi_K$ at the point in time t2', the end of the integration time is also attained. Shortly before time t2', a new clock pulse $\phi 2'$ is applied so that a charge takeover from 166 to 161, which is indicated by arrow 504 (FIG. 3), can take place. This brings about a corresponding change in potential at the input of the evaluator 31. As is indicated in FIG. 3 the clock pulse $\phi 1'$ must be disconnected before this charge takeover.

Figure 6:
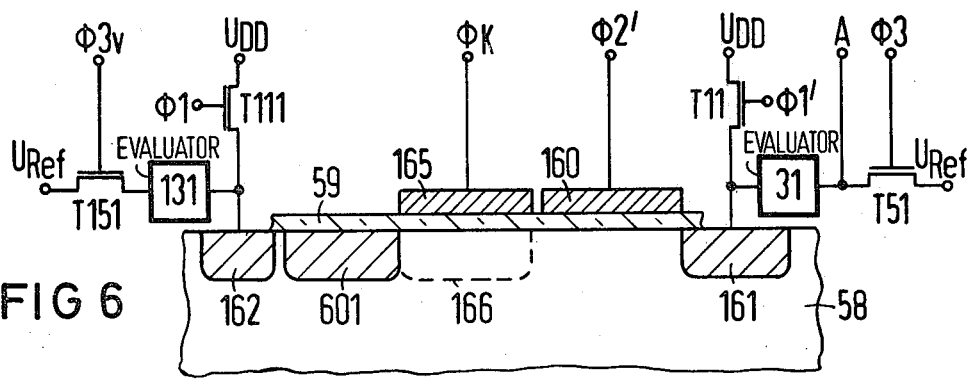
FIG. 6 shows a second circuit alternative to FIG. 4.

FIG. 6 differs from FIG. 5 only in that a photodiode 601 is arranged next to the MIS capacitor 165, 166, and indeed on the side of the same which is turned away from T31. The gate electrode of T31 is connected with the pulse voltage $\phi 2'$, whereas the clock pulse voltage $\phi 1'$ is supplied to the gate electrode of T11. The capacitance of the sensor element 11 according to FIG. 5 is larger than the capacitance of the sensor element according to FIG. 4, whereas the capacitance of the sensor element 11 according to FIG. 6 is larger than that of the sensor element according to FIG. 5.

Figure 7:
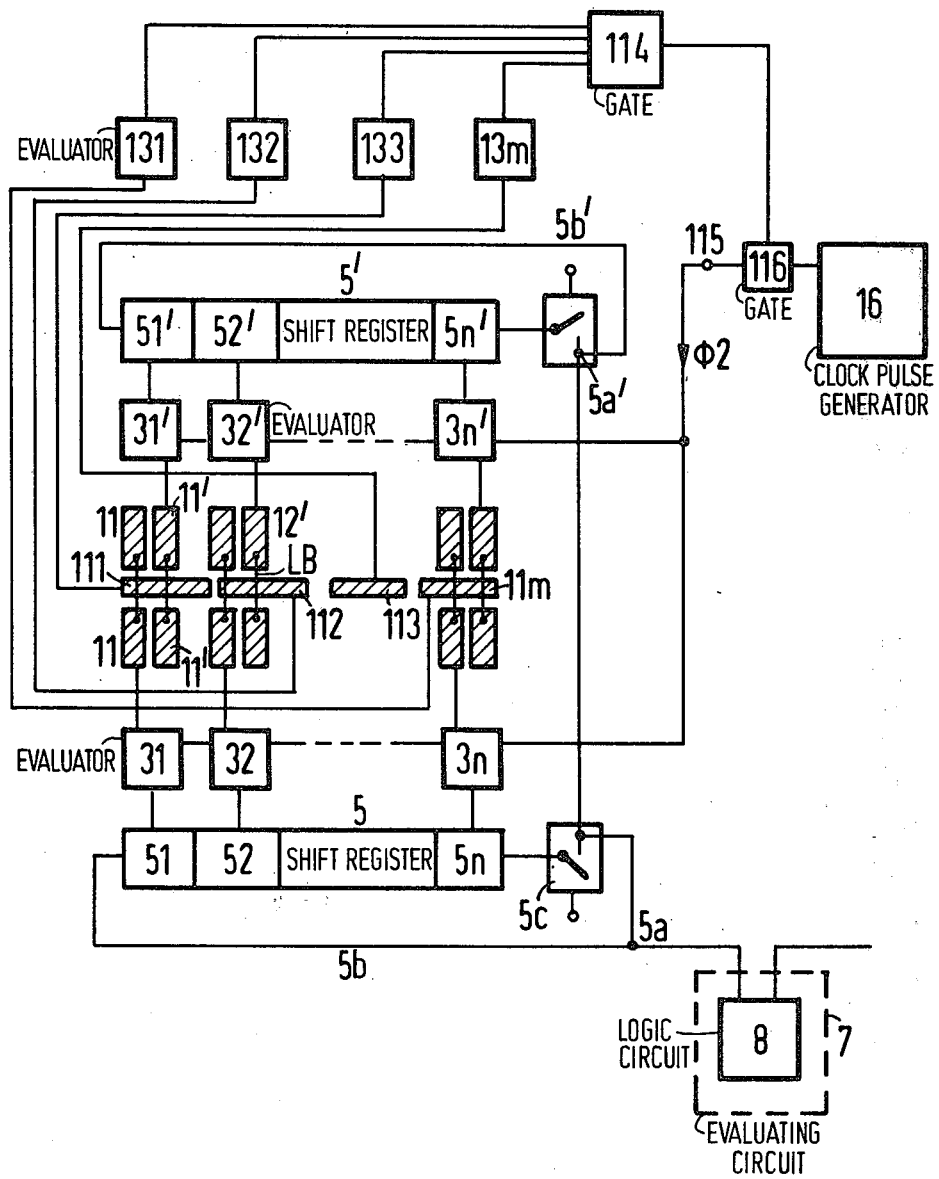
FIG. 7 shows a second embodiment of the invention.

In FIG. 7, a second embodiment example of the invention is represented, whereby two circuits according to FIG. 1 are provided with a common evaluating unit 7 and common devices 34 which are connected to this. The components of the partial circuit, which is arranged in FIG. 1 on the left side of the evaluating part 7, are provided in FIG. 7 with the same reference symbols. Thereby, the individual sensor elements 11, 12 . . . 1n are designed sufficiently narrow in the longitudinal direction of the image sensor 1 so that they correspond approximately to half the size of the evaluators 31, 32 . . . 3n. In these evaluators, for the sake of simple representation, also the switching transistors T11 and so on, T31 and so on, T61 and so on, T111 and so on as well as T151 were included. The corresponding components of the second circuit according to FIG. 1 are provided in FIG. 7 in each case with reference symbols which are supplemented by a prime mark. As can be seen, the sensor elements 12 . . . 1n of the one image sensor are arranged in the gaps between the sensor elements 11', 12' . . . 1n' of the other image sensor. The sensor elements are divided in the middle, whereby their parts in each case are connected with on another with a conducting bridge, for example LB. In the gaps between the sensor element parts in each case lie the comparing sensors 111 . . . 11m. In the case of this embodiment example, upon a sensor length corresponding to FIG. 1, double the number of sensor elements can be housed, so that the resolution of the line segment which is projected on to the sensor elements is significantly larger than in FIG. 1. In order to prevent a mutual interference of the information cycle in the shift registers 5 and 5', alternately activatable electronic switches 5c and 5c' are provided, which alternately connect one of the outputs 5a and 5a' with the one input of the logic circuit 8 and with the input of the corresponding first step or stage 51, or respectively, 51' of the shift registers. They are selected by means of clock pulse voltages $\phi 6$ and $\phi 6'$. Accordingly, the clock pulse periods of $\phi 6$ are separated from one another by intermediate periods of the same length. With these intermediate periods, the clock pulse periods of $\phi 6'$, fall together in time. The circuit represented in FIG. 7 is to be supplemented at the proper time from the evaluating circuit by means of a corresponding arrangement of two further image sensors 2 and 2' and the evaluators and shift registers which are associated to them, whereby their sensor elements are also designed so narrow that they correspond to half the evaluator width measured in the longitudinal direction of the image sensors 2, or respectively, 2'.

FIG. 8 shows schematically a circuit corresponding to FIG. 1, whereby the image sensors 1 and 2 are arranged next to one another, so that their sensor elements 11, 12 . . . 1n and 21, 22 . . . 2n are arranged in two lines which lie next to one another. The evaluators 31, 32 . . . 3n and 41, 42 . . . 4n in each case also contain the switching transistors T11, and so on, through T71 and so on, the evaluators 131 . . . 13m contain the transistors T111 and so on and T151. This embodiment example can be used when the images of the object in each case are only half projected onto the plane of the image sensors of 1 and 2, whereby the upper half of one image falls upon the part of the focal plane which lies above the dividing line 66, whereas the lower half of the other image is projected onto the lower part of the focal plane which lies below the dividing line 66. The line segments which are evaluated by means of the image sensors 1 and 2 thereby lie at the boundaries in each case of the image halves which are adjacent to the line 66. Such an image projection is also specified in the German patent application No. P2,838,647.2, incorporated herein by reference.

The circuits which were specified and represented can be integrated monolithically entirely or partially on a doped semiconductor body with special advantage. Thereby, the semiconductor body, for example 58, is preferably designed p-conducting and the remaining circuit structure is embodied in MOS-n-channel engineering. The semiconductor body lies at a reference potential, whereby the stated voltages and potentials display a positive sign in each case. In the case of a n-conducting semiconductor body and MOS-n-channel design, these signs become negative. The embodiment examples which are specified and represented have stops in the region of the image sensors 1 and 2, in which apertures are provided, through which an exposure of the sensor elements and the comparing sensor elements occurs.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A circuit having an exposure measuring portion and designed for sensor-controlled range measurement, comprising: two linear semiconductor image sensors having sensor elements; means for projecting line segments corresponding to two images separately obtained from an object onto the corresponding image sensors; an evaluator means connected to each of the sensor elements for switching between two different states depending upon whether a reference charge in the sensor elements is exceeded so as to digitalize sensor signals; an evaluating circuit means for evaluating the digitalized sensor signals in dependence upon varying relative position shifts with respect to a maximum correlation; device means connected to the evaluating circuit means for evaluating a range of said object; means for determining integration time of the sensor elements including strip-shaped comparing sensor elements positioned for exposure to an optically generated charge quantity which corresponds to a plurality of sensor elements in at least one of the image sensors; said comparing sensor elements being arranged along a longitudinal axis parallel to said at least one image sensor; dimensions of the individual comparing sensor elements along the longitudinal axis being substantially smaller than a corresponding dimension of the at least one image sensor; and each of the individual comparing sensor elements being connected via an evaluator means to associated inputs of a gate circuit means, an output of which represents an output of an exposure measuring portion which is formed of said comparing sensor elements, associated evaluator means, and gate circuit means, said evaluator means switching between two different states depending on whether a reference charge in the comparing sensor element is exceeded.

2. A circuit according to claim 1 wherein each of the linear image sensors has two parallel rows of sensor elements with the comparing sensor elements arranged between the two rows; each image sensor element being dimensioned in the longitudinal direction of the image sensor so that they correspond approximately to half of a corresponding dimension of the evaluator means associated therewith, each of the sensor elements in the first row connecting by a conducting bridge to a corresponding and adjacent element in the second row.

3. A circuit according to claim 2 wherein alternate pairs of interconnected sensor elements connect to corresponding evaluator means on alternate sides of the image sensor.

4. A circuit according to claim 1 wherein the two linear image sensors are arranged longitudinally in the same direction and the evaluator means associated with each linear image sensor connect to a shift register, the evaluator means and shift register being positioned adjacent the corresponding linear image sensor.

5. A circuit according to claim 1 wherein the evaluator means connected to the sensor elements and the comparing sensor elements each have an input connected via a switching transistor with a constant voltage source.

6. A circuit according to claim 5 wherein the evaluator means connected to the sensor elements and the comparing sensor elements have a further input which is connected via a further switching transistor with a reference voltage source.

7. A circuit according to claim 1 wherein the sensor elements and the comparing sensor elements are designed as MIS (Metal-Insulator-Semiconductor) capacitors.

8. A circuit according to claim 1 wherein the sensor elements and the comparing sensor elements are designed as photodiodes.

9. A circuit according to claim 1 wherein the sensor elements are designed as MIS (Metal-Insulator-Semiconductor) capacitors to which photodiodes are arranged adjacent thereto.

10. A circuit according to claim 1 which is at least partially monolithically integrated upon a doped semiconductor body.

11. A circuit according to claim 1 wherein said means for projecting and said device means are designed for range finding in a camera.

12. A circuit according to claim 11 wherein said device means controls a focus adjustment to project an image on a predetermined focal plane.

* * * * *